US011808862B2

(12) United States Patent
Teneze

(10) Patent No.: US 11,808,862 B2
(45) Date of Patent: Nov. 7, 2023

(54) METHOD AND INSTALLATION FOR CALIBRATING AN AIRBORNE GONIOMETRY APPARATUS

(71) Applicant: AVANTIX, Aix-en-Provence (FR)

(72) Inventor: Bernard Teneze, La Roque d'Antheron (FR)

(73) Assignee: AVANTIX, Aix-en Provence (FR)

( * ) Notice: Subject to any disclaimer, the term of this patent is extended or adjusted under 35 U.S.C. 154(b) by 13 days.

(21) Appl. No.: 17/679,305

(22) Filed: Feb. 24, 2022

(65) Prior Publication Data
US 2022/0276391 A1 Sep. 1, 2022

(30) Foreign Application Priority Data
Feb. 26, 2021 (EP) .................................. 21305238.4

(51) Int. Cl.
*G01S 19/23* (2010.01)
*G01S 19/40* (2010.01)
(52) U.S. Cl.
CPC .............. *G01S 19/23* (2013.01); *G01S 19/40* (2013.01)
(58) Field of Classification Search
CPC ................................ G01S 19/23; G01S 19/40
USPC .................................................... 342/357.23
See application file for complete search history.

(56) References Cited

U.S. PATENT DOCUMENTS

| 2006/0238413 | A1 | 10/2006 | Yehudaie | |
| 2017/0148340 | A1* | 5/2017 | Popa-Simil | G09B 9/48 |
| 2018/0149729 | A1* | 5/2018 | Grandin | G01S 7/021 |

FOREIGN PATENT DOCUMENTS

| CN | 108303019 A | * | 7/2018 | |
| EP | 1877823 | | 1/2008 | |
| FR | 3027460 A1 | * | 4/2016 | |
| WO | WO-2010136409 A1 | * | 12/2010 | G01S 3/026 |

OTHER PUBLICATIONS

European Search Report dated Sep. 17, 2021 in EP21305238.4 (10 pages).

* cited by examiner

*Primary Examiner* — Harry K Liu
(74) *Attorney, Agent, or Firm* — ARC IP LAW, PC; Joseph J. Mayo

(57) ABSTRACT

A method and installation for calibrating an airborne goniometry apparatus by means of a calibration generator, remote from the airborne goniometry apparatus. The method includes sharing, between the goniometry apparatus and the calibration generator, a calibration sequence. The method also includes sharing, between the goniometry apparatus and the calibration generator, a start time of the calibration sequence. The method further includes executing the calibration sequence by the goniometry apparatus and by the calibration generator, at the start time. The start time is determined in reference to the same clock, referred to as a reference clock, provided to the goniometry apparatus and the calibration generator, by an external source.

12 Claims, 2 Drawing Sheets

METHOD AND INSTALLATION FOR CALIBRATING AN AIRBORNE GONIOMETRY APPARATUS

This application claims priority to European Patent Application Number 21305238.4, filed 26 Feb. 2021, the specification of which is hereby incorporated herein by reference.

BACKGROUND OF THE INVENTION

Field of the Invention

The present invention relates to a method for calibrating an airborne goniometry apparatus. It likewise relates to an installation implementing such a method.

The field of the invention is the field of airborne goniometry apparatuses for detecting radiofrequency transmitters.

Description of the Related Art

An airborne goniometry apparatus generally consists of an array of antennas and at least one receiver connected to said array of antennas. It is used to detect radiofrequency transmitters located at ground or sea level, and more generally at a lower altitude that is overflown by the vehicle transporting said airborne goniometry apparatus.

In order to determine the position of the transmitter of a radio signal received by the goniometry apparatus, the latter determines on the one hand the frequency of said received signal and measures the value of a predetermined quantity. Then, the measured value is compared with reference values stored in a predetermined calibration table for said frequency, each associated with a geographical position. By identifying, in the calibration table associated with the frequency of the signal, the reference value closest to the measured value, it is possible to determine the geographical position of the transmitter of the received radio signal. According to one embodiment, the measured quantity is a covariance matrix, and the geographical position is given by a pair of angles: a bearing angle ("bearing" hereinafter), an elevation angle ("elevation" hereinafter).

The calibration table is predetermined during a calibration phase. To detect signals in a broad range of frequencies, for example the frequency range of 30 Mhz-3000 MHz, it is necessary to determine a calibration table for each frequency, or each frequency band making up said range. In this case, the calibration phase comprises frequency scanning of said frequency range and determining reference values for each geographical position.

The calibration of a goniometry apparatus can be carried out in a laboratory, and in particular in an anechoic chamber, but such a calibration is not precise because it is removed from external conditions.

The calibration of an airborne goniometry apparatus can be carried out when said goniometry apparatus is airborne with a transmitter at ground level. However, this calibration solution poses problems in synchronizing the transmitter with the goniometry apparatus when the calibration comprises a frequency scan, which makes the calibration phase long and tedious.

One aim of one or more embodiments of the invention is to solve at least one of the above-mentioned shortcomings.

Another aim of one or more embodiments of the invention is to provide a solution for calibrating a goniometry apparatus in a more precise, faster and less tedious manner.

BRIEF SUMMARY OF THE INVENTION

One or more embodiments of the invention makes it possible to achieve at least one of these aims by a method for calibrating an airborne goniometry apparatus, in particular in motion, by means of a generator, referred to as calibration generator, remote from said airborne goniometry apparatus, in particular disposed at ground or sea level, said method comprising the following steps:
sharing, between said goniometry apparatus and said calibration generator, a calibration sequence,
sharing, between said goniometry apparatus and said calibration generator, a start time of said calibration sequence, and
executing said calibration sequence by said goniometry apparatus and by said calibration generator, at said start time;
characterized in that said start time is determined in reference to the same clock, referred to as reference clock, provided to said goniometry apparatus and to said calibration generator, by an external source.

Thus, one or more embodiments of the invention makes it possible to carry out a calibration of the airborne goniometry apparatus, not in the laboratory, but outdoors while said goniometry apparatus is airborne by an aircraft, under conditions similar to the conditions of use of said apparatus. Thus, the invention provides a more precise calibration of the airborne goniometry apparatus.

Furthermore, at least one embodiment of the invention proposes basing the synchronization of the airborne goniometry apparatus with the calibration generator, on a reference clock that is common to said goniometry apparatus and to said calibration generator and provided by an external source. Such a synchronization is faster, simpler and less tedious because it does not require the exchange of clock signals between the calibration generator and the airborne goniometry apparatus for synchronization. Such a synchronization is more precise because it is based on an external clock source and is less prone to clock drifts that may occur in the goniometry apparatus or in the calibration generator.

According to one or more embodiments, the reference clock may comprise, or be, a clock signal provided by an atomic clock.

Such a reference clock offers the benefit of being very precise and being subject to little drift over time. Thus, the obtained synchronization is more precise.

According to one or more embodiments, the reference clock is a satellite clock.

A satellite has a very precise clock, which makes it possible to carry out precise synchronization.

Moreover, and more importantly, the distance separating the satellite from the airborne goniometry apparatus is of the same order of magnitude as that separating said satellite from the calibration generator. Thus, the clock signal provided by the satellite is received with zero or negligible offset by the airborne goniometry apparatus and the calibration generator. This makes it possible to obtain very good synchronization of the goniometry apparatus and the calibration generator.

According to at least one embodiment, the reference clock can be the clock of a satellite positioning system, such as for example GPS (for "Global Positioning System") or GALILEO or BEIDOU, and is provided:
to the goniometry apparatus by a first receiver of said satellite positioning system, such as for example a first GPS receiver, coupled with said airborne goniometry apparatus; and to the calibration generator by a second receiver of said satellite positioning system, such as for example a second GPS receiver, coupled with said calibration generator.

Thus, each receiver can be used both to determine a geographical position and to provide a reference clock.

The first receiver is airborne with the goniometry apparatus. The first receiver can be built into the airborne goniometry apparatus, or be an external receiver linked to said airborne goniometry apparatus. In the latter case, the first receiver can for example be a receiver of the aircraft transporting the goniometry apparatus.

The second receiver is located at the calibration generator. The second receiver can be built into the calibration generator or be an external receiver linked to said calibration generator.

In one or more embodiments, the reference clock may be a clock provided by a communication network, such as a cell phone network or an Internet-type wireless communication network.

Since such a network has transmitters and receivers distributed over a large geographical area, it is possible to have a precise reference clock of the same value over the whole region over which the airborne goniometry apparatus travels during calibration.

According to one or more embodiments, the step of sharing a calibration sequence may comprise a transmission, by the goniometry apparatus to the calibration generator, of data representing said calibration sequence via a wireless link. In this case, the goniometry apparatus is a master apparatus, and the calibration generator is a slave apparatus and follows the goniometry apparatus.

Of course, in one or more embodiments, it is possible for the calibration generator to transmit the data representing the calibration sequence to the airborne goniometry apparatus. In this case, the calibration generator is the master apparatus, and the airborne goniometry apparatus is the slave apparatus and follows the calibration generator.

The wireless link can be a one-way link.

According to one or more embodiments, the step of sharing a start time may comprise a transmission, by the goniometry apparatus to the calibration generator, of data representing said start time. In this case, the goniometry apparatus is a master apparatus, and the calibration generator is a slave apparatus and follows the airborne goniometry apparatus.

Of course, in one or more embodiments, it is possible for the calibration generator to transmit the data representing the start time to the airborne goniometry apparatus. In this case, the calibration generator is the master apparatus, and the goniometry apparatus is the slave apparatus and follows the calibration generator.

The wireless link can be a one-way link.

In particular, this wireless link can be the same as the one used to share the data relating to the calibration sequence.

Advantageously, in at least one embodiment of the invention, the calibration sequence may comprise several iterations of a calibration step comprising the following operations:
emitting, by the calibration generator, at least one calibration signal at an emission frequency;
receiving said at least one calibration signal by the airborne goniometry apparatus;
determining, by said airborne goniometry apparatus, at least one value, and in particular a covariance matrix, depending on the at least one received signal; and
storing said value associated with said frequency.

This calibration step can be repeated for each frequency, or frequency band, of a frequency range with a view to scanning said frequency range.

This calibration step can be repeated for each position of the calibration generator relative to the airborne goniometry apparatus, when one of them is in motion with respect to the other: for example when the airborne goniometry apparatus is in motion relative to the calibration generator, to cover a range of geographical positions.

Each position can be given by a pair of angles {Bearing; Elevation}:
the "bearing" represents the bearing angle between the calibration generator and the airborne goniometry apparatus, and
the "elevation" representing the elevation angle between the calibration generator and the airborne goniometry apparatus.

In particular, in one or more embodiments, the calibration sequence may comprise a frequency scan of a given frequency range.

The calibration sequence may comprise the indication of each frequency, or band of frequencies, to be scanned and the order in which these frequencies, or bands of frequencies, are to be scanned.

Alternatively, in one or more embodiments, the calibration sequence may comprise the indication of a starting frequency and a frequency scanning rule starting from said starting frequency.

Of course, these examples are non-limiting.

Additionally, in one or more embodiments, the calibration sequence may comprise scanning a range of positions of the calibration generator relative to the airborne goniometry apparatus.

Each relative position can be given, as shown herein before, by a pair of angles {bearing; elevation}. In this case, the position scan can relate to the bearing or to the elevation or to both, in turn or at the same time.

The calibration sequence may comprise the indication of each relative position to be scanned and the order in which these positions are to be scanned.

Alternatively, in one or more embodiments, the calibration sequence may comprise the indication of a relative starting position and a position scanning rule starting from said relative starting position.

In one or more embodiments, the calibration sequence can comprise, for a relative position of the calibration generator, a frequency scan of a frequency range. Then, the relative position is changed, and a new calibration sequence is performed, and so on.

According to at least one embodiment of the invention, an installation for calibrating an airborne goniometry apparatus is proposed, said installation comprising a generator, referred to as calibration generator, configured to share, with said airborne goniometry apparatus, a calibration sequence and a start time of said calibration sequence, said installation comprising:
a first clock receiver, coupled with said airborne goniometry apparatus, configured to receive a clock signal and provide a clock to said goniometry apparatus, and
a second clock receiver, coupled with said calibration generator, configured to receive a clock signal and provide a clock to said calibration generator;
said receivers being configured to receive a clock signal from the same source, external to said airborne goniometry apparatus and to said calibration generator, and to provide an identical clock, referred to as reference clock.

In one or more embodiments, each clock receiver can be:
- a satellite receiver, and in particular a receiver of a satellite positioning system, and more particularly a GPS receiver, to receive a clock signal provided by said satellite,
- a receiver of a wireless communication network, such as for example the cell phone network or the Internet network, to receive a clock signal emitted by said communication network.

In one or more embodiments, the installation may comprise the external source providing the clock, or the clock signal.

In one or more embodiments, the installation may comprise the airborne goniometry apparatus, and optionally the aircraft moving said airborne goniometry apparatus.

Typically, the external clock source can be a clock source providing a wireless clock signal, of any type as long as the clock signal can be picked up at the airborne goniometry apparatus and at the calibration generator with no offset or with a negligible offset, thus allowing synchronization of these two devices.

BRIEF DESCRIPTION OF THE DRAWINGS

Other benefits and features shall become evident upon examining the detailed description of an entirely non-limiting embodiment, and from the enclosed drawings in which.

DETAILED DESCRIPTION OF THE INVENTION

It is understood that the one or more embodiments disclosed hereunder are by no means limiting. In particular, it is possible to imagine variants of the invention that comprise only a selection of the features disclosed hereinafter in isolation from the other features disclosed, if this selection of features is sufficient to confer a technical benefit or to differentiate the invention with respect to the prior state of the art. This selection comprises at least one functional feature which lacks structural details, or only has a portion of the structural details if that portion is only sufficient to confer a technical benefit or to differentiate the invention with respect to the prior state of the art.

In the figures the same reference has been used for the features that are common to several FIGURES.

Figure 1:
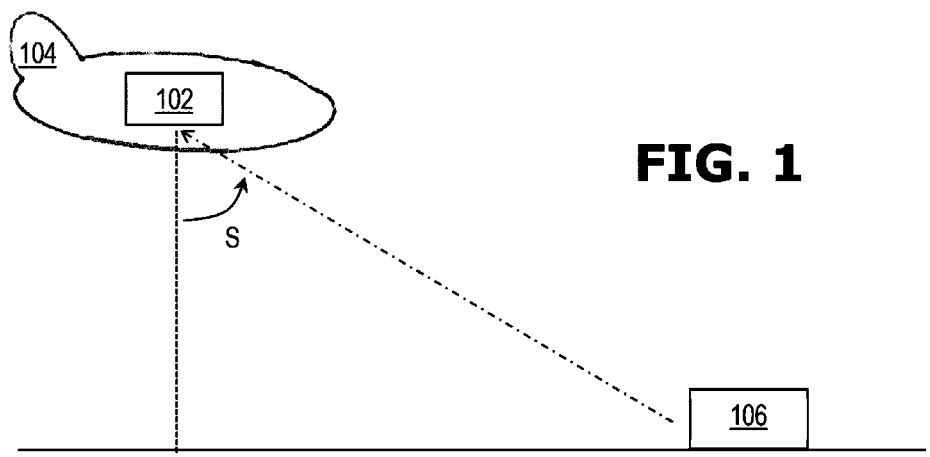
FIG. 1 is a schematic depiction of a non-limiting exemplary embodiment of a configuration for calibrating an airborne goniometry apparatus, according to one or more embodiments of the invention.

FIG. 1 is a schematic depiction of a non-limiting exemplary embodiment of a configuration for calibrating an airborne goniometry apparatus, according to one or more embodiments of the invention.

FIG. 1 schematically shows a goniometry apparatus 102 transported by an aircraft, such as for example an airplane 104, according to one or more embodiments of the invention.

A calibration generator 106, of known position, is used to calibrate the airborne goniometry apparatus 102. The calibration generator 106 can be stationary or mobile. The calibration generator 106 can for example be disposed on the ground.

The calibration of the goniometry apparatus 102 is performed as follows. A calibration signal of known frequency is sent by the calibration generator 106 to the goniometry apparatus 102. The goniometry apparatus measures a quantity. The stored value is stored associated with the known emission frequency, and the known position of the calibration generator 106 relative to the airborne goniometry apparatus 102.

For each position of the calibration generator 106 with respect to the airborne goniometry apparatus 102, the calibration step is repeated for different frequencies, or frequency bands, with a view to scanning an entire broad range of frequencies, in the context of a calibration sequence. Thus, at the end of calibration, a calibration table is obtained. This calibration table comprises, for each {frequency, position} pair a calibration value.

According to at least one embodiment, the goniometry apparatus comprises an array of receiving antennas. In this case, the measured quantity can, in an entirely non-limiting manner, be a covariance matrix indicating the reception differences between said receiving antennas.

The position of the calibration generator 106 with respect to the goniometry apparatus 102 can be given by a combination of two angles, namely:
- a bearing angle, denoted G, not shown in FIG. 1, which corresponds to the angle, in the horizontal plane, between on the one hand the direction connecting the aircraft 104 and the calibration generator 106, and on the other hand a reference direction, for example magnetic north; and
- an elevation angle, denoted S, corresponding to the angle formed between on the one hand the vertical direction between the goniometry apparatus 102 (and thus the aircraft 104) and the ground, and on the other hand the direction connecting the goniometry apparatus 102 (and thus the aircraft 104) and the calibration generator 106.

These angles can be provided by sensors equipping the goniometry apparatus 102 or the aircraft 104.

Alternatively, in one or more embodiments, these angles can be calculated from a piece of altitude data and a piece of geolocation data of the aircraft 104, respectively from the goniometry apparatus 102, provided by sensors equipping said aircraft 104 or said goniometry apparatus 102. Indeed, since the geolocation of the calibration generator 106 is known, the bearing G and elevation S angles can be calculated from the altitude and the geolocation of the goniometry apparatus 102 (or of the aircraft 104).

Each calibration signal emitted by the calibration generator 106 can be a signal burst.

Thus, in at least one embodiment, during the calibration phase, it is very important for the goniometry apparatus 102 to know the frequency of each calibration signal emitted by the calibration generator 106, at the time when it receives this calibration signal. This requires the goniometry apparatus 102 and the calibration generator 106 to be synchronized so that when the calibration generator 106 emits a calibration signal of a given frequency $f_0$, the goniometry apparatus 102 knows the frequency $f_0$ in order to store the value of the quantity measured in association with said frequency $f_0$.

Figure 2:
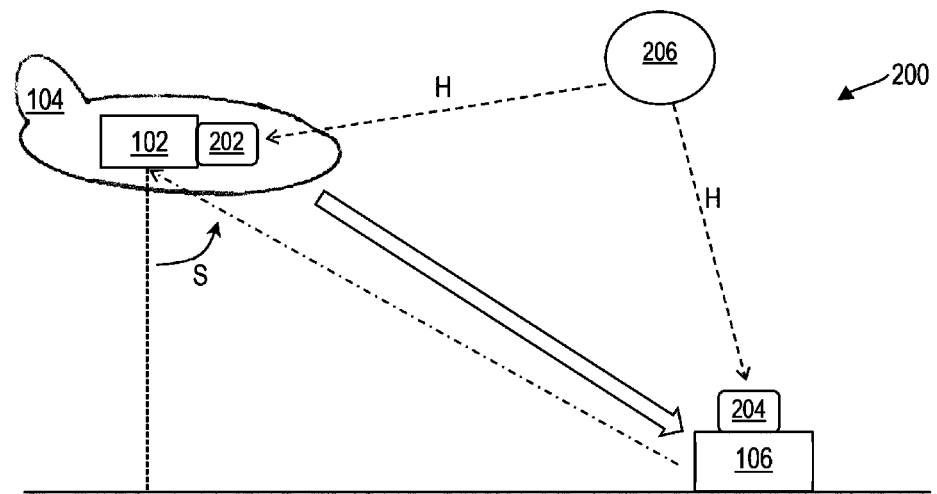
FIG. 2 is a schematic depiction of a non-limiting exemplary embodiment of a configuration for calibrating an airborne goniometry apparatus according to the invention, according to one or more embodiments of the invention.

FIG. 2 is a schematic depiction of a non-limiting exemplary embodiment of an installation for calibrating an airborne goniometry apparatus according to one or more embodiments of the invention.

The installation 200 of FIG. 2 is depicted in the same configuration as that depicted in FIG. 1 with the same features.

The installation 200 comprises the calibration generator 106.

Additionally, the installation 200 further comprises a first receiver 202 and a second receiver 204 of a clock signal provided by a first external source 206 so that the first and second receiver receive the same clock, referred to as reference clock.

The first receiver 202 is coupled with the airborne goniometry apparatus 102 and communicates the clock H provided by the external source 206 to said airborne goniometry apparatus 102. The first receiver 202 can be built into the airborne goniometry apparatus 102, or can be a receiver of the aircraft 104, or can even be an independent apparatus coupled with said airborne goniometry apparatus 102.

The second receiver 204 is coupled with the calibration generator 106 and communicates the clock H provided by the external source 206 to said calibration generator 106. The second receiver 204 can be built into the calibration generator 106, or can be an independent apparatus coupled with said calibration generator 106.

Thus, according to one or more embodiments of the invention, it is possible to have a single clock in the airborne goniometry apparatus 102 and the calibration generator 106 so that these two apparatuses can be synchronized in a very precise manner. It is then possible to share between these two apparatuses a calibration sequence comprising frequency scanning of a broad range of frequencies, without losing synchronization.

In at least one embodiment, each clock receiver 202 and 204 is a satellite receiver, and in particular a receiver of a satellite positioning system, and more particularly a GPS receiver, for receiving a clock signal generated by an atomic clock of said satellite. Thus, the received clock signal is very precise. Additionally, the offset between the clock received by the goniometry apparatus 102 and the calibration generator 106 is zero or negligible.

Figure 3:
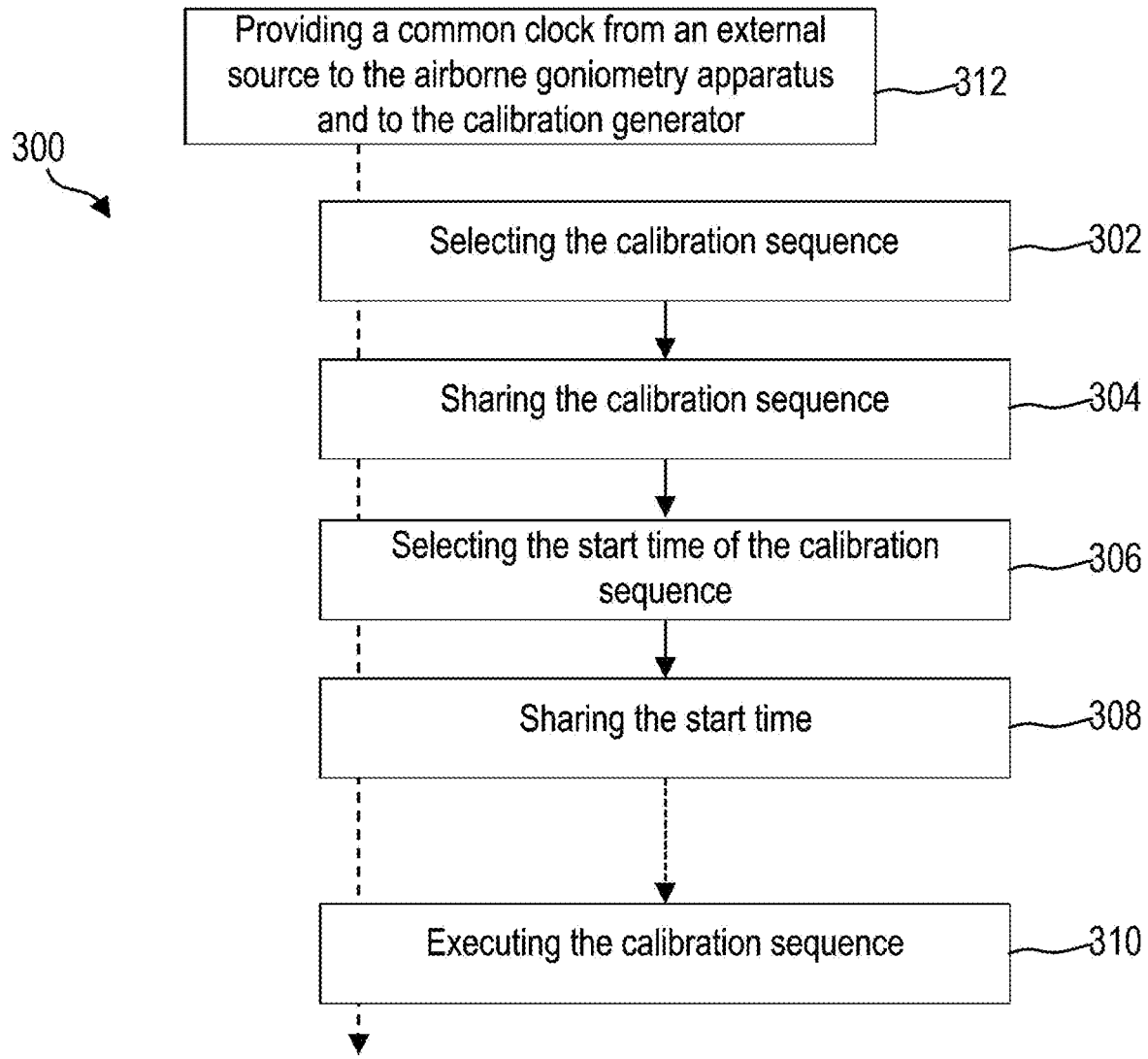
FIG. 3 is a schematic depiction of a non-limiting exemplary embodiment of a method according to the invention, according to one or more embodiments of the invention.

FIG. 3 is a schematic depiction of a non-limiting exemplary embodiment of a calibration method of an airborne goniometry apparatus according to one or more embodiments of the invention.

The method 300 of FIG. 3 makes it possible to calibrate an airborne goniometry apparatus, such as for example the apparatus 102 of FIGS. 1-2, with a remote calibration generator, in particular on the ground, for example such as the calibration generator 106 of FIGS. 1-2.

The method 300 can be implemented in an installation according to the invention, and in particular in the installation 200 of FIG. 2.

The method 300 comprises a step 302 during which a calibration sequence is selected. The choice of the calibration sequence can comprise a choice of a calibration position among a plurality of calibration positions, a choice of a range of frequencies to be scanned, etc. The choice of the sequence can be carried out in a management apparatus that is simultaneously remote from the goniometry apparatus and from the calibration generator, or in the calibration generator, or in the airborne goniometry apparatus. Hereinafter, and in an entirely non-limiting manner, it is considered that the choice of the calibration sequence is carried out in the airborne goniometry apparatus, in particular while said apparatus is airborne in an aircraft.

The selected sequence is then shared with the calibration generator during a step 304, for example via a one-way wireless link between the goniometry apparatus and the calibration generator.

During a step 306, a start time of the calibration sequence is selected. The selection of the start time can be carried out in the remote management apparatus, or in the calibration generator, or in the airborne goniometry apparatus. Hereinafter, and in an entirely non-limiting manner, it is considered that the selection of the calibration time carried out in the airborne goniometry apparatus, in particular while said apparatus is airborne in an aircraft.

The selected start time is then shared with the calibration generator during a step 306, for example via the one-way wireless link.

When the start time is reached, the calibration generator begins to execute the calibration sequence, that is to carry out a frequency scan of the emission frequency range, as indicated in the calibration sequence.

On the other hand, at the same start time, according to one or more embodiments of the invention, the goniometry apparatus executes the same calibration sequence as shared with the calibration generator, that is to carry out a frequency scan of the receiving frequency range, as indicated in the calibration sequence, so as to determine and store a reference value for each frequency, or frequency band, emitted by the calibration generator.

According to one or more embodiments of the invention, to guarantee that the calibration sequence is triggered at the same instant by the airborne goniometry apparatus and the calibration generator, that is to guarantee that, at each instant "t" during the calibration sequence, the value measured and stored by the goniometry apparatus actually corresponds to the emission frequency of the calibration generator at said instant "t", the method 300 comprises a step 312 providing a reference clock, provided by an external source, to said goniometry apparatus and to said calibration generator. The reference clock is the clock of a satellite.

It is this shared clock that is used by the airborne goniometry apparatus and by the calibration generator to determine whether or not the start time has been reached.

In the example depicted in FIG. 3, according to one or more embodiments of the invention, the reference clock is provided in a punctual manner, before the step 302 of selecting the calibration sequence. Obviously, the step 312 of providing the clock can be carried out, at another instant before the start time.

Alternatively, or additionally, according to one or more embodiments of the invention, the step 312 can be repeated several times during the method 300 so that the value of the clock is provided several times during said method.

According to at least one embodiment, the step 312 can be carried out continuously during the entire method according to the invention so that the value of the clock is continuously known by the airborne goniometry apparatus and the calibration generator at all times.

Additionally, in the example depicted, according to one or more embodiments of the invention, the calibration sequence and the start time are shared during two discrete steps. According to one alternative, the calibration sequence and the start time can be shared during a single step.

Additionally, according to one or more embodiments of the invention, the calibration sequence can be carried out uninterrupted.

Alternatively, according to one or more embodiments of the invention, the calibration sequence can be interrupted and resumed one or more times, at the initiative of the airborne goniometry apparatus, or of the calibration generator.

Obviously, the invention is not limited to the examples and embodiments detailed herein before given for purposes of illustration and the general scope of the invention is defined in the claims.

The invention claimed is:

1. A method for calibrating an airborne goniometry apparatus by means of a generator, wherein said generator comprises a calibration generator, remote from said airborne goniometry apparatus, said method comprising:
   sharing, between said airborne goniometry apparatus and said calibration generator, a calibration sequence,
   sharing, between said airborne goniometry apparatus and said calibration generator, a start time of said calibration sequence, and
   executing said calibration sequence by said airborne goniometry apparatus and by said calibration generator, at said start time;
wherein said start time is determined in reference to a same clock comprising a reference clock, provided to said airborne goniometry apparatus and to said calibration generator, by an external source.

2. The method according to claim 1, wherein the reference clock comprises a clock signal provided by an atomic clock.

3. The method according to claim 1, wherein the reference clock is a clock of a satellite.

4. The method according to claim 1, wherein the reference clock is a clock of a satellite positioning system and is provided:
   to the airborne goniometry apparatus by a first receiver of said satellite positioning system coupled with said airborne goniometry apparatus; and
   to the calibration generator by a second receiver of said satellite positioning system coupled with said calibration generator.

5. The method according to claim 1, wherein the reference clock is a clock provided by a communication network, wherein said communication network comprises a cell phone network.

6. The method according to claim 1, wherein said sharing said calibration sequence comprises a transmission, by the airborne goniometry apparatus to the calibration generator, of data representing said calibration sequence, via a one-way wireless link.

7. The method according to claim 1, wherein said sharing the start time comprises a transmission, by the airborne goniometry apparatus to the calibration generator, of data representing said start time, via a one-way wireless link.

8. The method according to claim 1, wherein the calibration sequence comprises several iterations of a calibration step comprising:
   emitting, by the calibration generator, at least one calibration signal at an emission frequency;
   receiving said at least one calibration signal by the airborne goniometry apparatus;
   determining, by said airborne goniometry apparatus at least one value depending on the at least one calibration signal that is received, wherein said at least one value comprises a covariance matrix; and
   storing said at least one value associated with said emission frequency.

9. The method according to claim 1, wherein the calibration sequence comprises a frequency scan of a given frequency range.

10. The method according to claim 1, wherein the calibration sequence comprises scanning a range of positions of the calibration generator relative to the airborne goniometry apparatus.

11. An installation for calibrating an airborne goniometry apparatus, said installation comprising a generator, wherein said generator comprises a calibration generator, configured to share with said airborne goniometry apparatus a calibration sequence and a start time of said calibration sequence, said installation comprising:
    a first clock receiver, coupled with said airborne goniometry apparatus, configured to receive a clock signal and provide a clock to said airborne goniometry apparatus, and
    a second clock receiver, coupled with said calibration generator, configured to receive a clock signal and provide a clock to said calibration generator;
    wherein said first clock receiver and said second clock receiver are configured to receive the clock signal from a same source, external to said airborne goniometry apparatus and to said calibration generator, and to provide an identical clock, wherein said identical clock comprises a reference clock.

12. The installation according to claim 11, wherein each clock receiver of said first clock receiver and said second clock receiver is:
    a satellite receiver, wherein said satellite receiver comprises a receiver of a satellite positioning system comprising a GPS receiver, wherein said satellite receiver receives the clock signal provided by said satellite positioning system, and
    a receiver of a wireless communication network, wherein said wireless communication network comprises a cell phone network or an Internet network, wherein said wireless communication network receives a clock signal emitted by said communication network.

\* \* \* \* \*